United States Patent [19]

Sänger et al.

[11] Patent Number: 4,631,096

[45] Date of Patent: Dec. 23, 1986

[54] HIGH ENERGY MATERIALS CONTAINING METASTABLE HELIUM, A PROCESS FOR PRODUCING SAME AND APPLICATIONS THEREOF

[75] Inventors: Georg Sänger, Voorschoten; Gerrit Hietkamp, Noordwijkerhout, both of Netherlands; Walter Peschka, Sindelfingen, Fed. Rep. of Germany

[73] Assignee: Deutsche Forschungs-und Versuchsanstalt fur Luft-und Raumfahrt E.V., Bonn, Fed. Rep. of Germany

[21] Appl. No.: 656,311

[22] Filed: Oct. 1, 1984

[51] Int. Cl.$^4$ .................. C06B 47/00; C01B 23/00
[52] U.S. Cl. ........................ 149/1; 204/156; 204/177; 423/262
[58] Field of Search ............... 423/262; 204/156, 164, 204/177, 178; 149/1; 60/205, 218

[56] References Cited

U.S. PATENT DOCUMENTS

| | | | |
|---|---|---|---|
| 2,393,594 | 1/1946 | Davis | 149/1 |
| 2,811,431 | 10/1957 | Zwicky et al. | 149/1 |
| 3,254,485 | 6/1966 | Bernstein | 60/205 |
| 3,278,351 | 10/1966 | Null et al. | 149/1 |
| 3,516,921 | 6/1970 | Manion et al. | 204/156 |
| 3,946,332 | 3/1976 | Samis | 372/58 |
| 4,193,827 | 3/1980 | Woollam | 149/1 |
| 4,536,657 | 8/1985 | Bruel | 250/423 P |

FOREIGN PATENT DOCUMENTS

| | | | |
|---|---|---|---|
| 76648 | 10/1970 | German Democratic Rep. | 60/218 |
| 1056657 | 1/1967 | United Kingdom | 423/262 |
| 1066941 | 1/1984 | U.S.S.R. | 423/262 |

*Primary Examiner*—Edward A. Miller
*Attorney, Agent, or Firm*—Oblon, Fisher, Spivak, McClelland & Maier

[57] ABSTRACT

A new high energy chemical complex is provided formed from metastable helium fixed on ammonia ($HE_mNH_3$), so that the metastable helium electron is captured so as to be held in the "L" layer of the metastable helium atom.

The process for producing the $He_mNH_3$ complex comprises the following steps: excitation of helium to create metastable helium; deposition of metastable helium on $NH_3$ to form the complex; and accumulation or condensation of the product.

The invention finds a particular application as a propellant in the aerospace field.

7 Claims, No Drawings

HIGH ENERGY MATERIALS CONTAINING METASTABLE HELIUM, A PROCESS FOR PRODUCING SAME AND APPLICATIONS THEREOF

BACKGROUND OF THE INVENTION

1. Field of the Invention

The present invention concerns a material with high energy per mass unit ($E_g$) providing a high specific impulse ($I_s$). This material could be used in particular as rocket fuel. The invention also provides a process for producing such a material. Specifically, a high energy complex of metastable helium fixed on ammonia is addressed.

2. Background of the Prior Art

The most widely used propellant at present is formed by a mixture of liquid hydrogen and oxygen which releases an energy of $E_g = 32$ kcal/g, providing a specific impulse $I_s = 528$ sec. This propellant is considered as having the highest energy among those currently used, its ejection speed being 5180 m/sec.

In order to save costs, a continued need is felt for a propellant releasing considerably higher energy than the known liquid hydrogen and oxygen propellant both because distant space missions (because of the better payload to propellant weight ratio) requires such a fuel and also because then single stage to orbit vehicles might become feasible.

The physical-chemical reactions releasing the highest energy are (Schmidt, "Technische Thermodynamik", Springer 1963; Peschka "Proceedings of the IX international astronautical congress" Amsterdam 1958; Rosen, "Current status of free radicals and electronically excited metastable species as high propellants" Drexel University, Philadelphia Pa.):
First the recombination of atomic hydrogen:

$$H + H = H_2 + 4.3 \text{ eV}$$

102.8 kcal/mol = 51.4 kcal/g = 4.3 eV giving $I_s = 2100$ sec and an ejection speed of 20770 m/sec.
Second the recombination of metastable Helium:

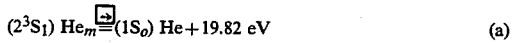

(a)

(theoretical lifetime 8200 sec)

(b)

(theoretical lifetime 0.02 sec)

(Because of the considerably shorter lifetime reaction (b) is not important and will not be considered below.
444 kcal/mol = 111.2 kcal/g = 19.82 eV; giving $I_s = 3100$ sec and an ejection speed of 30000 m/sec.

Neither of these reactions is possible when the electron spins (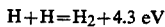) are aligned in parallel. In fact, according to Heitler-London (Weitzel, "Lehrbuch der Theoretischen Physik", Springer 1958, Berlin—Gottingen—Heidelberg)—only hydrogen atoms with antiparallel spins recombine to form a hydrogen molecule ($H_2$) and—according to the Pauli—principle (Weitzel, above ref.)—the two He - electrons in their basic state (both in the "K"-shell) must have antiparallel spins. In the metastable state one electron is in the "K"-shell and the other in the "L"-shell and as long their spins are kept parallel recombination is impossible because of forbidden transfer. This parallel spin alignment is well known and offers a possibility to keep an electron in the "L"-shell.

It was thought (Peschka, see above ref.) that the parallel alignment of electron spins could be obtained by means of application of an external magnetic field at low temperature to reduce the tendency of thermal disturbance as much as possible. Since that time extensive and thorough experimental and theoretical research has been conducted on atomic hydrogen and the following has been established:

(a) atomic hydrogen may be maintained stable for hours at densities varying between $10^{16}$ and $10^{17}$ atoms/cm$^3$ (magnetic field 5 Tesla, temperature lower than 1° K.).

(b) the parallel alignment of the two electron spins is possible to secure by means of a magnetic field.

The practical application of these results, however, does not seem possible in the near future.

Insofar as metastable He is concerned, the inventors have no knowledge of the existence of research carried out in this field. The disadvantage of both reactions—atomic hydrogen and metastable helium—is that for the parallel aligned electrons nearly no activation energy is required to assume antiparallel spin; even in a strong magnetic field at low temperature saturation is only asymptotically achieved which means that there is always a finite number of electrons changing from parallel to antiparallel spin and will recombine. The heat released will then ignite via chain reaction the metastable species in case they were stored in higher concentrations or densities—which of course should always be the case for the application concerned.

It should be emphasized, however, at the same time that atomic hydrogen and metastable helium behave chemically in the same way as alkaline metals because they have also only one electron in the outer shell. (Muschlitz Jr. "Metastable atoms and molecules", Science Vol. 159, February 1968).

SUMMARY OF THE INVENTION

The present invention has accordingly as its principal aim to capture the outer electron of the metastable helium by forming a relatively stable compound or solid solution. In this case, a certain activation energy is required before the recombination of the metastable helium can take place. However, the "capture" of the electron causes a slight loss of energy and requires in addition another substance with which the metastable helium is associated and is to be considered as a sort of ballast. Nevertheless, the reaction energy rate is so high (19.82 eV = 444 kcal/mol) that despite the loss and the ballast the remaining total energy per mass unit might still be relatively high.

As mentioned above, metastable helium behaves similarly to alkaline metals, which ought to result in its being able to form similar compounds. However, the following conditions must be fulfilled: the outer electron must be fixed and no other free antiparallel electron is allowed to approach metastable helium atom, otherwise recombination will occur.

The substance which captures the outer electron and fulfills this requirement is ammonia ($NH_3$). It is known that ammonia may form solutions of high concentrations of alkaline metals. Electrolytic measurements have furthermore shown that the alkaline ions are cations (positive) and the $NH_3$ - ions are anions (negative). This means that the other electron of the alkaline is fixed to $NH_3$. The bonding energy of the electron to $NH_3$ is also known: it is of the order of 1.4 eV, depending on the concentration. (Vogt, Elektroen in der Rolle von Ionen im Kristallgitter und in Losungen" Die Naturwissenschaften September 1948; McNeal, Goldman, "Anomalous conductivity of Quench-Condensed Sodium - Ammonia Films" Physical Review Letters February 1977).

For this metastable helium - ammonia complex the energy break down is then as follows:

| | |
|---|---|
| reaction energy metastable helium | 19.82 eV |
| bonding energy of captured electron | 1.4 eV |
| total mass g/mol 17 + 4 = | 21 g/mol |
| energy per mol 19.82 − 1.4 = | 18.42 eV |
| = | 424 kcal/mol |
| energy per g | 20.2 kcal/g |

The production process of the metastable helium - ammonia complex according to the invention is as follows:

excitation of helium to create metastable helium deposition of metastable helium on $NH_3$ to form the complex accumulation and condensation of the product For the excitation of helium, corona or radio frequency discharge etc. are considered capable to produce sufficiently high rates of metastable helium for practical amounts of propellants (Rosen, see above ref. page 16). In order to prevent recombination on the chamber walls various techniques are described (Thrush, "Radical formation and trapping from the gas phase" in 'Formation and trapping of free radicals' ed. Bass and Broida, Academic Press, New York). The formation of the $He_m$-$NH_3$ complex occurs in the gas phase and is then deposited on the chamber wall which should be cooled down to liquid helium temperature. The cooling effect may be enhanced in the gas phase by adding normal gaseous helium. Furthermore, there is no serious disadvantage in the event the metastable helium recombines in the gas phase because it will not freeze out on the chamber wall but rather escape; $NH_3$-molecules, which freeze out without a captured electron, are an additional ballast and in order to keep this percentage low, metastable helium should be used in excess so that the oods of the $NH_3$ molecule capturing a metastable helium electron are great.

As noted, to produce metastable He well known radio frequency or corona discharge may be applied. The radio frequency discharge is considered powerful enough to produce technical amounts of metastable species (J. C. Mathis, 125 J. of Astrophysics, p. 318 (1957). Of course one has to keep in mind that in the discharge tube not only metastable He is produced but also free electrons, ions and other radiation. The $He_m$-$NH_3$-complex must be protected against this, because the captured electron on $NH_3$ may be released by intense radiation or by electron and ion bombardment, with the consequence that it recombines.

A suitable radio frequency transmitter will have a power rating of $\sim 1$ kW with 10% efficiency→100 W. This means that within $\sim$ one hour 100 W $\times$ 3600 sec = 360 kW sec = 86 kcal are produced or approximately 4 g of $He_m NH_3$. The pressure in the radio frequency discharge tube is normally kept at 1-2 mbar. To obtain a minimal amount of $He_m NH_3$, the flow of $He_m$ must be equivalent to that of $NH_3$. In order to increase the probability for $NH_3$ to capture a metastable He electron one should run the process with an excess of $He_m$. (Recombined He will not condense but escape due to the high vapor pressure).

As noted, in order to optimize the efficiency of the formation process (gas phase) a strong magnetic field should be applied to maintain parallel spin alignment of the He electrons and to reduce in this way the recombination rate. Electrons and ions which are also produced in the discharge tube may be neutralized by installing two metallic strips, one positive, the other negatively charged at the discharge end.

The whole assembly, particularly the reaction chamber, is cooled down to liquid helium temperature, except of course the discharge tube. Greater amounts of $He_m NH_3$ should be cooled down to low temperature for safety reasons. Small amounts of $He_m NH_3$ ($\sim 10^{-6}$ Mol) may be stored for $\sim 30$ min at $\sim 30°$ K.

A stream of metastable helium gas formed during the first step of the process is fed into the reaction enclosure into which also flows $NH_3$ gas for reacting with the metastable helium. The reaction takes place in the gas phase. In order to increase the cooling effect normal helium gas may be added.

This invention has been described above with regard to specific and preferred embodiments. However, the invention resides in the discovery that metastable helium may be complexed with ammonia to give a stable composition. The resulting high energy complex is of extreme value as a propellant. Particularly, apparatus needed to prepare the complex, such as radio frequency discharge tubes, magnetic field generators, etc., are all discussed in references cited above, and should not be considered to limit the invention beyond the scope of the claims set forth below.

What is claimed as new and desired to be secured by Letters Patent of the United States is:

1. A high energy chemical complex comprising $He_m NH_3$.

2. The $He_m NH_3$ complex as claimed in claim 1, wherein it is in the form of a solid.

3. A process for producing a $He_m NH_3$ complex comprising the following steps:

excitation of He to create metastable helium ($He_m$) using corona or radio frequency discharge methods;

admixing said $He_m$ with $NH_3$ in a reaction chamber and allowing a reaction to take place therebetween while applying a magnetic field of sufficient strength to maintain parallel spin of He electrons;

accumulating and condensing said reaction product.

4. The process of claim 3 wherein the reaction of $He_m$ with $NH_3$ is accomplished in the gas phase in the presence of normal He gas which cools the formed complex $He_m NH_3$.

5. The process of claim 3 wherein an excess of $He_m$ over $NH_3$ is maintained in order to increase the reaction probability for $NH_3$ with metastable He and to reduce the deposition of free $NH_3$.

6. The process of claim 3 wherein yield of formation of the $He_m NH_3$ complex is increased by applying magnetic and electric fields of predetermined strength.

7. The process of claim 3 wherein the condensation of the $He_m NH_3$ complex takes place at the temperature of liquid helium.

* * * * *